United States Patent [19]

Flakus

[11] Patent Number: 5,066,713
[45] Date of Patent: Nov. 19, 1991

[54] PROCESS FOR THE PREPARATION OF AQUEOUS, RADIATION-CURABLE URETHANEACRYLATE DISPERSIONS

[75] Inventor: Werner Flakus, Recklinghausen, Fed. Rep. of Germany

[73] Assignee: Huels Aktiengesellschaft, Marl, Fed. Rep. of Germany

[21] Appl. No.: 502,692

[22] Filed: Apr. 2, 1990

[30] Foreign Application Priority Data

May 19, 1989 [DE] Fed. Rep. of Germany ....... 3916340

[51] Int. Cl.$^5$ .................... C08G 18/08; C08G 18/67; C09D 175/16
[52] U.S. Cl. .................... 524/591; 524/539; 528/49; 528/75
[58] Field of Search .................... 528/49, 75; 524/591, 524/539

[56] References Cited

U.S. PATENT DOCUMENTS

| | | | |
|---|---|---|---|
| 3,929,929 | 12/1975 | Kuehn | 528/75 |
| 4,094,842 | 6/1978 | Wenzel et al. | 528/75 |
| 4,123,423 | 10/1978 | Wenzel et al. | 528/75 |
| 4,131,602 | 12/1978 | Hodakowski et al. | 528/49 |
| 4,133,723 | 1/1979 | Howard | 528/49 |
| 4,246,391 | 1/1981 | Watson, Jr. | 528/49 |
| 4,268,426 | 5/1981 | Williams et al. | 528/75 |
| 4,277,380 | 7/1981 | Williams et al. | 528/75 |
| 4,312,798 | 1/1982 | Kovacs | 528/75 |
| 4,314,922 | 2/1982 | Lehner et al. | 528/75 |
| 4,320,220 | 3/1982 | Pampouchidis | 524/591 |
| 4,339,566 | 7/1982 | Rosenkranz et al. | 528/75 |
| 4,451,636 | 5/1984 | Tsao et al. | 528/75 |
| 4,497,932 | 2/1985 | Trovati | 524/591 |
| 4,507,458 | 3/1985 | Shiraki et al. | 528/49 |
| 4,605,723 | 8/1986 | Flakus | 528/49 |
| 4,608,409 | 8/1986 | Coady et al. | 528/49 |
| 4,711,929 | 12/1987 | Stamegna et al. | 524/539 |
| 4,722,966 | 2/1988 | Flakus | 528/75 |
| 4,730,021 | 3/1988 | Zom et al. | 524/591 |
| 4,870,152 | 9/1989 | Meixner et al. | 528/49 |
| 4,874,799 | 10/1989 | Hung et al. | 528/75 |
| 4,914,173 | 4/1990 | Ansell | 528/49 |
| 4,920,157 | 4/1990 | Schulz et al. | 528/75 |
| 5,003,026 | 3/1991 | Ehrhart et al. | 528/49 |

*Primary Examiner*—John Kight, III
*Assistant Examiner*—Rabon Sergent
*Attorney, Agent, or Firm*—Oblon, Spivak, McClelland, Maier & Neustadt

[57] ABSTRACT

Radiation-curable urethane-acrylate dispersions are obtained by emulsifying a reaction product of (A) an NCO-containing urethane acrylate prepared by reacting isophorone diisocyanate with a hydroxylcrylate and (B) a COOH-containing ester polyol prepared from polyol and an anhydride, such as trimethyladipic anhydride, maleic anhydride or succinic anhydride.

18 Claims, No Drawings

PROCESS FOR THE PREPARATION OF AQUEOUS, RADIATION-CURABLE URETHANEACRYLATE DISPERSIONS

BACKGROUND OF THE INVENTION

1. Field of the Invention

The present invention relates to a process for the preparation of aqueous, radiation-curable urethane-acrylate dispersions, in the absence of solvents; the dispersions prepared by this process; and cured films of these dispersions.

2. Discussion of the Background

Radiation-curable dispersions have been developed in recent years. Their development has resulted from the further development of emulsions initially cured merely by physical means in the direction of systems which are thermally or chemically post-cured. Now, films formed, for example, from unsaturated, aqueous dispersions can be cured and polymerized using UV, laser or electron beam curing in a few seconds or fractions of a second.

Radiation-curable, aqueous polyurethane dispersions as described, for example, in DE-A-3,526,016 have a long shelf life, extending over several years. The cured films have interesting properties when applied to sheet steel and are resistant to solvents.

The preparation of emulsions to meet such demanding requirements is very complex. Initially, saturated and unsaturated polyols are brought into reaction with for example isophorone diisocyanate in order to form prepolymers with NCO terminal groups. The system must be diluted with acetone up to 50% by weight depending on the molecular weight and viscosity. Then follows the chemical incorporation of surface-active, ionic reactants, for example, a 30% strength aqueous sodium salt solution of the appropriate aminocarboxylic acids with the formation of an ionic, NCO-free prepolymer system which is then emulsifiable in water. Finally, the auxiliary solvent, for example acetone, is removed by distillation. Thus, prepolymer formation, dispersion and the removal of acetone by distillation requires 15 to 25 hours, depending on the structure of the reactants.

In addition, it is not possible to reuse the acetone distillate directly, because it contains water.

Against the background of required economy in raw materials and energy, the process described above for the preparation of such dispersions is unsatisfactory. Not only the reaction time and the reaction volume, but also the consumption of solvent and energy are considerable. Moreover, the urethane-acrylate ionomers which are formed are known to be thermally and chemically sensitive, i.e., subject to premature polymerization during prepolymer formation or at least to undergoing gradual changes on standing.

Any simplification of the process is therefore useless if the shelf life of the emulsions, which according to DE-A-3,526,016 is required to be some years, is impaired.

Thus, there remains a need for a process for preparing aqueous, radiation-curable, urethane-acrylate dispersions which is simple, provides savings in time and raw materials, and yields dispersion with good properties and a long shelf life. There is also a need for the dispersions produced by such a process and cured films of these dispersions.

SUMMARY OF THE INVENTION

Accordingly, one object of the present invention is to provide a simplified process for preparing aqueous, radiation-curable, urethane-acrylate dispersions in the absence of solvent, which yields dispersions and cured films which conform to the highest quality requirements, and the dispersions and cured films thus-obtained.

It is another object of the present invention to provide a process for preparing aqueous, radiation-curable, urethane-acrylate dispersions having a long shelf life.

These and other objects, which will become apparent during the course of the following detailed description, have been achieved by preparing dispersions with specific COOH-containing ester polyols. The present invention therefore relates to a process for the preparation of aqueous, radiation-curable, urethane-acrylate dispersions, in which isophorone diisocyanate is initially reacted with a hydroxyacrylate at 25° C. to 50° C. in a ratio of equivalents of NCO to OH of 3:1 to 5:1 with the formation of NCO-containing urethane-acrylates, and then the mixture is further reacted with COOH-containing ester polyols, prepared from polyols and dicarboxylic anhydrides, in the absence of solvents at 50° C. to 100° C. with the formation of substantially NCO-free, COOH-containing urethane-acrylates and the mixture is subsequently emulsified at 85° C. to 95° C. using aqueous solutions of bases.

DETAILED DESCRIPTION OF THE PREFERRED EMBODIMENTS

Particularly suitable COOH-containing ester polyols are those made from polyols and trimethyladipic anhydride.

Since the elimination of auxiliary solvents of any kind is an essential part of the object, all experiments were carried out in the absence of a solvent.

In the first place it was attempted, when working in accordance with DE-A-3,526,016, to dispense with the solvent. Doing without, for example, acetone in the progressive reaction of polyols and isocyanates results in viscosities of the relevant prepolymers (MW=2,500 to 4,000) which require working temperatures initially of 60° C. to 80° C., and finally of 90° C. to 100° C. The viscosity can be controlled to some extent by using simple mixers, and can be readily controlled using high speed mixers. Surprisingly, by exercising care, diverse acryloylurethane systems are obtained in this temperature range. Although using the acetone method and making rapid additions of aqueous, surface-active salts of the appropriate amino acids to the prepolymer at low temperatures results spontaneously in the desired chemical incorporation of the emulsifier and the formation of the corresponding ureacarboxylic acids, when solvents are excluded, undesired reactions also occur.

Thus, at 90° C. to 100° C., not only do the $NH_2$ equivalents of the surface-active aqueous salt solutions react selectively, but to a large extent water reacts with the NCO equivalents, with the elimination of $CO_2$. This results in the spontaneous and massive formation of foam in the reactor before any significant amounts of the surfactant can be introduced. The reactions occurring in a solution of acetone at low temperatures and without solvent at 90° to 100° C. are contrasted below.

A. The reaction occurring in a solution of acetone at low temperatures:

Prepolymer    surface-active salt solution

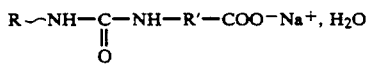

anionic prepolymer (water-in-oil) system

B. The reaction occurring preferentially at 90° C. to 100° C. is:

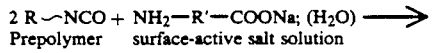

Prepolymer    surface-active salt solution

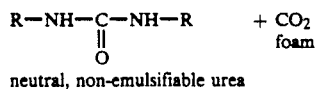

neutral, non-emulsifiable urea

It is clear from this that aqueous surfactant salt solutions at 90° C. to 100° C. cannot be used. Therefore, diverse surfactant systems which are either available only as an aqueous solution or as high melting point salts insoluble in the polymer, are eliminated as possible remedies.

It was also attempted to incorporate the emulsifier with the aid of dimethylolpropionic acid in the absence of organic solvents.

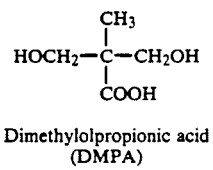

Dimethylolpropionic acid
(DMPA)

As is well known, urethane formation is, among other things, considerably retarded in the presence of acidic groups such as —COOH. Thus, the final result is a prepolymer low in NCO groups, having an NCO content of about 0.2%. The addition of dilute NaOH, or tertiary amines, and residual proportions of water initially causes a wetting or organic and aqueous components, but finally results in a tacky resin which contains water but is not water-thinnable. Since, in a solution of acetone, DMPA forms prepolymers with COOH terminal groups, albeit after long reaction times, which with bases give usable emulsions, it can be inferred that at relatively high temperatures DMPA enters into side reactions of various kinds.

The extent of the difficulties encountered—side reactions at many different levels—is considerable when working in the absence of a solvent at high temperatures and viscosities, as evidenced by innumerable unsuccessful experiments. On the other hand, working with a solvent such as acetone is required to achieve a large measure of reproducible and very good end products, with conventional dispersions.

In contrast, the process according to the present invention enables aqueous, radiation-curable, polyurethane emulsions to be expediently and reproducibly prepared without side reactions or malfunctions at 90° C. to 100° C. and in the absence of an organic auxiliary solvent.

According to the present invention, isophorone diisocyanate as starting material is initially reacted with a hydroxyacrylate, such as 2-hydroxyethyl acrylate, i.e., partially acrylated to form component (A). The formation of (A) is carried out at a temperature of 25° C. to 50° C., preferably 30° C. to 45° C., and the ratio of the NCO groups of the isophorone diisocyanate to the OH groups of the hydroxyacrylate is suitably 3:1 to 5:1.

Meanwhile, a polyol, such as trimethylolpropane, butanediol, polyetherdiols and the like are melted with the addition of a dicarboxylic anhydride, such as 2,2,4(2,4,4)-trimethyladipic anhydride (TMAA) until the homogeneous melt has reached about 90° C. to form component (B). At this temperature, only the formation of acid ester polyols of the anhydride results, without the elimination of water. Measurement of the acid number provides a simple method of determining the exact conversion (conversion 0% = 2 COOH equivalents, conversion 100% = 1 COOH equivalent). Further esterification of the acid component is virtually undetectable below 120° C. Suitably, the anhydride and the polyol are reacted in relative amounts such that the ratio of OH groups in the polyol and the anhydride groups is from 7:1 to 11:1, preferably 8:1 to 10:1.

The melt, at a temperature of about 90° C. is advantageously cooled to about 50° C. and introduced as component (B) into the preliminary mixture (A) at a rate depending on the heat of reaction, such that the reaction mixture (A) gradually is heated to a temperature of from 50° C. to 100° C., preferably from 60° C. to 95° C. The viscous prepolymer melt can be stirred in glass vessels with glass stirrers at 95° C. (high speed mixers are thus not required).

Component (B) is added to Component (A) in an amount sufficient to obtain a prepolymer which is substantially free from NCO groups or has a low content of NCO groups (NCO≦0.2% by weight, preferably ≦0.1% by weight) but which still has a content of 1 to 2% by weight, preferably 1.2 to 1.8% by weight of COOH relative to the solids. Then, dilute sodium hydroxide solution is initially introduced and then residual hot water at 85° C. to 95° C., preferably 85° C. to 90° C., with stirring. Cooling down leaves a fine-particled, bluish dispersion with a long shelf life, which after drying by physical means and radiation-curing gives high gloss films.

The properties of the dispersions prepared according to the present invention when applied as a film to sheet steel are equivalent to the systems prepared from a solution in acetone.

The COOH-containing ester polyols may be reaction products of (a) polyol mixtures of, e.g., trimethylolpropane, aliphatic diols such as ethylene glycol and homologous such as polyether polyols with (b) dicarboxylic anhydrides, such as trimethyladipic anhydride (e.g., technical grade TMAA), maleic anhydride or succinic anhydride, preferably TMAA.

The hydroxyacrylate may be any suitable hydroxy-lower alkyl acrylate. 2-Hydroxyethyl acrylate is a particularly suitable hydroxyacrylate.

Bases used for neutralizing and emulsifying the COO-containing prepolymers are NaOH, KOH, LiOH, NH₄OH and/or tertiary amines such as triethylamine or dimethylaminoethanol, preferably NaOH.

The outstanding thermal and chemical stabilization which acryloylurethanes acquire from partial esterification with dicarboxylic anhydrides such as for example TMAA, cannot be conclusively explained, the least so in comparison with dimethylolpropionic acid.

Trimethyladipic anhydride is a liquid anhydride of low viscosity which is formed by the thermal elimination of water from trimethyladipic acid with ring formation. The industrial product contains approximately equal proportions of the 2,2,4- and 2,4,4-methyl isomers. For convenience, the acids and corresponding anhydrides are shown below.

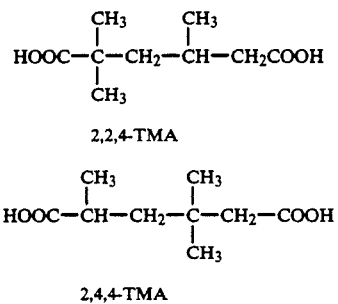

2,2,4-TMA 2,4,4-TMA

After elimination of water:

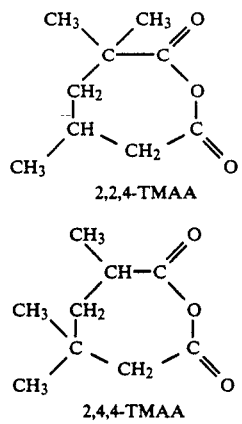

2,2,4-TMAA 2,4,4-TMAA

Other carboxylic anhydrides were tested for suitability in the preparation of solvent-free, radiation-curable, aqueous emulsions. However, the results showed that although, related industrially accessible acid anhydrides can be used in the process, they may give rise to significant disadvantages. For instance, the use of anhydrides of aromatic character produces films which yellow during radiation-curing.

Other anhydrides form emulsions having a low solids content and require a large amount of dilution with water and/or impair the shelf life of the emulsions.

The advantages of the process according to the invention for the preparation of aqueous, radiation-curable, urethane-acrylate dispersions can be stated as follows:

1. The time required for preparing the emulsions is reduced from about 20 hours to 7 hours (see, e.g., Examples 1 and 4);
2. The reaction volume required is reduced by almost 40%;
3. Savings of about 40% by weight (relative to the aqueous emulsion) or about 100% by weight (relative to the cured coating) of solvent, for example acetone, and the corresponding distillation costs are obtained;
4. Alkali-resistant coatings are produced from the emulsions prepared according to the present invention after radiation-curing. The coatings pass the so-called washing liquor test (exposure to 4% strength NaOH at 80° C. for 3 hours without being affected). Many conventional anionic dispersions do not meet this standard;

5. The shelf life of the emulsions prepared according to the invention is excellent and the properties of the emulsions applied to sheet steel are of a high standard; and 6. The process is very simple to carry out.

Other features of the present invention will become apparent in the course of the following descriptions of exemplary embodiments which are given for illustration of the invention and are not intended to be limiting thereof.

EXAMPLES

Comparative Example 1 (Conventional Process: Method of operation employing a solvent)

Urethane-urea-acrylic dispersions

Basis: Isophorone diisocyanate-polyether/polyols
Surfactant: An aqueous solution of sodium aminocaproate To a preliminary mixture of 1,110 g of isophorone diisocyanate (IPDI) (5 moles) and 2.8 g of dibutyltin dilaurate (DBTL) are added dropwise with stirring, initially at 25° C. to 35° C., a mixture of 1,272.7 g of polytetrahydrofuranetherdiol (2 moles), MW about 650, hydroxyl number 176 mg of KOH/g (TERATHANE ® 650 supplied by DuPont), 235.3 g of 2-hydroxyethyl acrylate (2 moles), hydroxyl number 476 mg of KOH/g and 134 g of trimethylolpropane (1 mole). The mixture is then heated to 50° C. to 60° C. until a resin is formed having 1.6% to 1.9% by weight of NCO. After dilution with 2,754.8 g of acetone, 398 g of the sodium salt of aminocaproic acid in the form of a 30% aqueous solution are added to the reaction mixture with stirring over a period of 5 minutes at about 40° C. to 50° C. The reaction mixture is then dispersed in 3,610 g of water. The acetone-containing, aqueous dispersion is freed from acetone by distillation. The solids content of the dispersion is about 42.5% by weight. The preparation time is about 18 hours. The viscosity of the dispersion: DIN cup No. 4:18 sec.

The properties of the films on sheet steel after curing of the dispersion with the addition of 2.5% by weight of DAROCUR ® 1,116, a commercially available product supplied by E. Merck, Darmstadt, by exposure to 200 Watt/inch for 5 seconds are given below:

| | |
|---|---|
| König pendulum hardness: (in accordance with DIN 53 157) | 45 sec |
| Erichsen indentation: (in accordance with DIN 53 156) | >10.0 mm |
| Layer thickness: | 145 μm |
| Ultimate tensile strength: (in accordance with DIN 53 455) | 27.2 ± 4.5 N/mm² |
| Solvent resistance Abrasion test under 1 kg load/cm² | |
| Acetone: | no attack after >100 rubs |
| Xylene: | no attack after >100 rubs |
| Washing liquor test: Effect of 4% strength NaOH at 80° C. for 6 × 30 min. | Result: Film significantly attacked after 30 min. |

Comparative Example 2 (Acetone-free method according to Example 1)

The ingredients as described in Comparative Example 1 are processed until a resin is formed having 1.6% to 1.9% by weight of NCO. The reaction mixture is then heated to 95° C. and 398 g of the sodium salt of aminocaproic acid are added in the form of a 30% strength aqueous solution. Pronounced foam formation and gelation of the product is observed after the addition of only one third of the salt solution.

Comparative Example 3 (Acetone-free method, experiment with dimethylolpropionic acid)

Basis: Isophorone diisocyanate-polyether/polyols surfactant: Dimethylolpropionic acid (DMPA)

To an initial mixture of 1,332 g of isophorone diisocyanate (6 moles), 0.17 g of DBTL and 1.6 g of Ionol CP (2,6-di-tert-butyl-4-methylphenol) are added dropwise with stirring, at 25° C. to 35° C., 358.1 g of 2-hydroxyethyl acrylate (3 moles) (hydroxyl number: 470 mg of KOH/g) and stirring is continued until a resin is formed having 22.4% to 23.4% by weight of NCO. Then, 1,260.7 g of polytetrahydrofuranetherdiol (2 moles) MW abut 650, hydroxyl number 178 mg of KOH/g (TERATHANE ® 650 supplied by DuPont), 134 g of dimethylolpropionic acid (1 mole), 134 g of trimethylolpropane (1 mole), 3.2 g of dibutyltin dilaurate are added and the reaction temperature is increased from 35°–45° C. to 90° C., until a NCO content of 0.2% to 0.3% by weight has been reached. Then 400 g of 10% strength sodium hydroxide solution (40 g of NaOH+360 g of H$_2$O) (1 mole) are introduced, and the reaction mixture is homogenized and diluted with 4,467 g of hot water. A rubber-like solid forms, and phase separation occurs after a few hours.

Example 4 (According to the Present Invention)

Basis: Isophorone diisocyanate/polyether-polyols 2,2,4-(2,4,4)-trimethyladipic anhydride A) To a preliminary mixture of 1,110 g of IPDI (5 moles) and 0.13 g of dibutyltin dilaurate (DBTL) and 1.5 g of Ionol CP (2,6-tert-butyl-4-methylphenol) are added dropwise with stirring, at 25° C. to 35° C., 238.7 g of 2-hydroxyethyl acrylate (2 moles) (hydroxyl number 470 mg of KOH/g) until a resin has been formed with a NCO content of 24.9% to 25.9% by weight (A). Then, 1,657.7 g of reaction product (B) described below are introduced into the preliminary mixture (A), and the reaction temperature is brought to 90° C. to 100° C. in accordance with the viscosity and heat of reaction.

Reaction Product (B)

| | |
|---|---|
| 1,260.7 g of | polytetrahydrofuranetherdiol (2 moles) MW about 650, hydroxyl number 178 mg of KOH/g, (TERATHANE ® 650 supplied by DuPont); |
| 90 g of | 1,4-butanediol (1 mole); |
| 134 g of | of trimethylolpropane (1 mole); and |
| 170 g of | of trimethyladipic anhydride (1 mole) | are heated to 90° C., and formation of the semi-ester occurs which is characterized by an acid number of 34 mg of KOH/g. After cooling the mixture to 50° C., 3 g of dibutyltin dilaurate ar introduced.

Into the prepolymer (prepared from (A) and (B)) having a NCO content of about 0.2% by weight, are introduced 400 g of 10% strength NaOH (40 g of NaOH+360 g of H$_2$O) (1 mole of NaOH), and the mixture is homogenized at 85° C. to 90° C. Addition of 4,145.1 g of H$_2$O leads indirectly to a fine-particled bluish emulsion of about 40% strength. The preparation time is about 6 hours.

Viscosity of the dispersion: Ford cup No. 4 (16 sec).

The properties of the films on sheet steel after curing of the dispersion to which 2.0% by weight of DATOCUR ® 1,173 have been added, by exposure to 200 Watt/inch for 5 seconds are given below:

| | |
|---|---|
| König pendulum hardness: (in accordance with DIN 53 157) | 42 sec |
| Erichsen indentation: (in accordance with DIN 53 156) | >10.0 mm |
| Layer thickness: | 130 μm |
| Ultimate tensile strength: (in accodance with DIN 53 455) | 32.5 ± 3.1 N/mm$^2$ |
| Elongation at break: | 141 ± 14% |
| Solvent resistance Abrasion test under 1 kg load/cm$^2$ | |
| Acetone: | no attack after >100 rubs |
| Xylene | no attack after >100 rubs |
| Washing liquor test: Effect of 4% strength NaOH at 80° C. for 6 × 30 min. | Result: No attack after 6 × 30 min. |

Example 5 (According to the present invention)

Basis: Isophorone diisocyanate/polyether-polyols-maleic anhydride

The preliminary mixture of ingredients as described in Example 4 is processed until a resin is formed having a NCO content of 24.9% to 25.9% by weight (A). Then 1,585.6 g of reaction product (B) described below is introduced into the preliminary mixture (A) and the reaction temperature is brought to 90° C. to 100° C. in accordance with the viscosity and heat of reaction.

Reaction Product (B)

| | |
|---|---|
| 1,260.7 g of | polytetrahydrofuranetherdiol (2 moles) MW about 650, hydroxyl number 178 mg of KOH/g, (TERATHANE ® 650 supplied by DuPont); |
| 90 g of | 1,4-butanediol (1 mole); |
| 134 g of | of trimethylolpropane (1 mole); and |
| 98 g of | of maleic anhydride (1 mole) | are heated to 90° C., and a semi-ester is formed, characterized by an acid number of 35.5 mg of KOH/g. After cooling the mixture to 50° C., 2.9 g of dibutyltin dilaurate are introduced.

Into the prepolymer (prepared from (A) and (B)) having a NCO content of about 0.2% by weight, are introduced 400 g of 10% strength NaOH (40 g of NaOH+360 g of H$_2$O) (1 mole of NaOH), and the mixture is homogenized. 5,084 g of H$_2$O are added to obtain indirectly a fine-particled bluish emulsion of about 35% strength. The preparation time is about 6 hours.

Viscosity of the dispersion: Ford cup No. 4 (25 sec).

The properties of the films on sheet steel after curing of the dispersion to which 2.0% by weight of DAROCUR ® 1,173 (relative to the resin) have been added by exposure to 200 Watt/inch for seconds are given below:

| | |
|---|---|
| König pendulum hardness: (in accordance with DIN 53 157) | 80 sec |
| Erichsen indentation: (in accordance with DIN 53 156) | >10.0 mm |

| | |
|---|---|
| Layer thickness: | 101 μm |
| Ultimate tensile strength: (in accordance with DIN 53 455) | 30.8 ± 2.9 N/mm² |
| Elongation at break: | 70 ± 11% |
| Solvent resistance Abrasion test under 1 kg load/cm² | |
| Acetone | no attack after >100 rubs |
| Xylene | no attack after >100 rubs |
| Washing liquor test: Effect of 4% strength NaOH at 80° C. for 6 × 30 min. | Result: No attack after 6 × 30 min. |

Example 6 (According to the present invention)

Basis: Isophorone diisocyanate/polyether-polyols-succinic anhydride

The preliminary mixture of ingredients as described in Example 4 are processed until a resin is formed having a NCO content of 24.9% to 25.9% by weight (A). Then 1,587.6 g of reaction product (B) described below are introduced into the preliminary mixture (A) and the reaction temperature is brought to 90° C. to 100° C. in accordance with the viscosity and heat of reaction.

Reaction Product (B)

| | |
|---|---|
| 1,260.7 g of | polytetrahydrofuranetherdiol (2 moles) MW about 650, hydroxyl number 178 mg of KOH/g, (TERATHANE ® 650 supplied by DuPont); |
| 90 g of | 1,4-butanediol; |
| 134 g of | of trimethylolpropane; and |
| 100 g of | of succinic anhydride | are heated to 90° C., and a semi-ester is formed, characterized by an acid number of 35.4 mg of KOH/g. After cooling the mixture to 50° C., 2.9 g of dibutyltin dilaurate are introduced.

Into the prepolymer (prepared from (A) and (B)) having a NCO content of about 0.2% by weight, are introduced 400 g of 10% strength NaOH (40 g of NaOH+360 g of H₂O) (1 mole of NaOH) and the mixture is homogenized. The addition of 4,854 g of H₂O produces indirectly a fine-particled bluish emulsion of about 36% strength. The preparation time is about 6 hours.

Viscosity of the dispersion: Ford cup No. 4 (26 sec).

The properties of the films on sheet steel after curing of the dispersion to which 2.0% by weight of DAROCUR ® 1,173 (relative to the resin) have been added, by exposure to 200 Watt/inch for seconds are given below:

| | |
|---|---|
| König pendulum hardness: (in accordance with DIN 53 157) | 65 sec |
| Erichsen indentation: (in accordance with DIN 53 156) | >10.0 mm |
| Layer thickness: | 99 μm |
| Ultimate tensile strength: (in accordance with DIN 53 455) | 31.0 ± 3.7 N/mm² |
| Elongation at break: | 119 ± 16% |
| Solvent resistance Abrasion test under 1 kg load/cm² | |
| Acetone: | no attack after >100 rubs |
| Xylene: | no attack after >100 rubs |
| Washing liquor test: Effect of 4% strength NaOH at 80° C. for 6 × 30 min. | Result: No attack after 6 × 30 min. |

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A process for preparing an aqueous, radiation-curable, urethane-acrylate dispersion, comprising the steps:
   (i) reacting isophorone diisocyanate with a hydroxyacrylate at a temperature of 25° C. to 50° C., in a ratio of equivalents of NCO to OH of 3:1 to 5:1 to obtain an NCO-containing urethane-acrylate;
   (ii) reacting said NCO-containing urethane acrylate with a COOH-containing ester polyol, prepared from a polyol and a dicarboxylic anhydride, in the absence of a solvent at a temperature of 50° C. to 100° C., to obtain a substantially NCO-free, COOH-containing urethane-acrylate; and
   (iii) emulsifying said NCO-free, COOH-containing urethane-acrylate at a temperature of 85° C. to 95° C. with an aqueous solution of a base.

2. The process of claim 1, wherein said COOH-containing ester polyol is prepared from a polyol and an anhydride selected from the group consisting of trimethyladipic anhydride, maleic anhydride and succinic anhydride.

3. The process of claim 1, wherein the NCO content and the COOH content of said substantially NCO-free COOH-containing urethane-acrylate are ≦0.2% by weight and 1% to 2% by weight, relative to weight of the solids, respectively.

4. The process of claim 3, wherein the COOH content of said NCO-free, COOH-containing urethane-acrylate is 1.2% to 1.8% by weight, relative to the weight of the solids.

5. The process of claim 1, wherein said hydroxyacrylate is hydroxyethyl acrylate.

6. The process of claim 1, wherein said base is selected from the group consisting of NaOH, KOH, NH₄OH, LiOH, and tertiary amines.

7. An aqueous, radiation-curable, urethane-acrylate dispersion, prepared by a process comprising the steps:
   (i) reacting isophorone diisocyanate with a hydroxyacrylate at a temperature of 25° C. to 50° C., in a ratio of equivalents of NCO to OH of 3:1 to 5:1 to obtain an NCO-containing urethane-acrylate;
   (ii) reacting said NCO-containing urethane acrylate with a COOH-containing ester polyol, prepared from a polyol and a dicarboxylic anhydride, in the absence of a solvent at a temperature of 50° C. to 100° C., to obtain a substantially NCO-free, COOH-containing urethane-acrylate; and
   (iii) emulsifying said NCO-free, COOH-containing urethane-acrylate at a temperature of 85° C. to 95° C. with an aqueous solution of a base.

8. The dispersion of claim 7, wherein said COOH-containing ester polyol is prepared from a polyol and an anhydride selected from the group consisting of trimethyladipic anhydride, maleic anhydride and succinic anhydride.

9. The dispersion of claim 7, wherein the NCO content and the COOH content of said substantially NCO-free COOH-containing urethane-acrylate are ≦0.2% by weight and 1% to 2% by weight, relative to weight of the solids, respectively.

10. The dispersion of claim 9, wherein the COOH content of said NCO-free, COOH-containing urethane-acrylate is 1.2% to 1.8% by weight, relative to the weight of the solids.

11. The dispersion of claim 7, wherein said hydroxyacrylate is hydroxyethyl acrylate.

12. The dispersion of claim 7, wherein said base is selected from the group consisting of NaOH, KOH, $NH_4OH$, LiOH, and tertiary amines.

13. A cured film, prepared by curing an aqueous, radiation-curable, urethane-acrylate dispersion, which is prepared by a process comprising the steps:
   (i) reacting isophorone diisocyanate with a hydroxyacrylate at a temperature of 25° C. to 50° C., in a ratio of equivalents of NCO to OH of 3:1 to 5:1 to obtain an NCO-containing urethane-acrylate;
   (ii) reacting said NCO-containing urethane acrylate with a COOH-containing ester polyol, prepared from a polyol and a dicarboxylic anhydride, in the absence of a solvent at a temperature of 50° C. to 100° C., to obtain a substantially NCO-free, COOH-containing urethane-acrylate; and
   (iii) emulsifying said NCO-free, COOH-containing urethane-acrylate at a temperature of 85° C. to 95° C. with an aqueous solution of a base.

14. The film of claim 13, wherein said COOH-containing ester polyol is prepared from a polyol and an anhydride selected from the group consisting of trimethyladipic anhydride, maleic anhydride and succinic anhydride.

15. The film of claim 13, wherein the NCO content and the COOH content of said substantially NCO-free COOH-containing urethane-acrylate are ≦0.2% by weight and 1% to 2% by weight, relative to weight of the solids, respectively.

16. The film of claim 15, wherein the COOH content of said NCO-free, COOH-containing urethane-acrylate is 1.2% to 1.8% by weight, relative to the weight of the solids.

17. The film of claim 13, wherein said hydroxyacrylate is hydroxyethyl acrylate.

18. The film of claim 13, wherein said base is selected from the group consisting of NaOH, KOH, $NH_4OH$, LiOH, and tertiary amines.

* * * * *